United States Patent [19]

Watts

[11] 4,042,541

[45] Aug. 16, 1977

[54] EXPANDABLE POLYSTYRENE PARTICLES

[75] Inventor: Harry Watts, Sarnia, Canada

[73] Assignee: The Dow Chemical Company, Midland, Mich.

[21] Appl. No.: 750,068

[22] Filed: Dec. 13, 1976

[51] Int. Cl.$^2$ .............................................. C08J 9/22
[52] U.S. Cl. ........................ 260/2.5 B; 260/2.5 HB; 260/23 S
[58] Field of Search .................................... 260/2.5 B

[56] References Cited

U.S. PATENT DOCUMENTS

| | | | |
|---|---|---|---|
| 2,857,341 | 10/1958 | Colwell et al. | 260/2.5 B |
| 2,989,782 | 6/1961 | Barkhuff, Jr. et al. | 260/2.5 B |
| 3,461,088 | 8/1969 | Stohnecker et al. | 260/2.5 B |
| 3,663,466 | 5/1972 | Jablonski | 260/2.5 B |
| 3,736,273 | 5/1973 | Hatano et al. | 260/2.5 B |

*Primary Examiner*—Morton Foelak
*Attorney, Agent, or Firm*—R. B. Ingraham

[57] ABSTRACT

A mixture of calcium stearate and stearic acid in polystyrene particles containing volatile fluid-foaming agent provides a product with improved cooling time and uniform cell structure.

3 Claims, No Drawings

EXPANDABLE POLYSTYRENE PARTICLES

Expandable polystyrene particles are desirable for molding many articles. Such molding is usually done by the so-called steam-chest process wherein optionally the particles are partially foamed or pre-expanded by exposure to steam at about atmospheric pressure. The partially-expanded particles are optionally aged in air and subsequently placed in a steam chest mold in a quantity sufficient to fill the mold. The mold is closed and the particles within the mold exposed to steam at about two atmospheres for a sufficient length of time for the particles to expand and hopefully fuse together into a uniform body having the desired configuration. When the steam has been removed from the mold generally there is a period of time in which the article must remain in the mold before removal. Premature removal from the mold can result in swelling or other distortion of the article. The minimum time the article must remain in the mold before removal is generally referred to as the cooling time. The cooling time is a very important commercial property of expandable polystyrene particles. The shorter the cooling time, the more rapidly the mold can be recycled, and the number of molded articles produced per unit of time can increase significantly as the cooling time is reduced, however, the cooling time is one important factor. A second important factor is the cell size of the resultant foam. If a molded article is obtained with large size foam cells, for many purposes it is unsatisfactory. Such articles tend to be brittle and have an undesirable appearance. It is very desirable that the cell size of such articles or molding be small, that is, not readily detected and distinguished by the naked eye. Various additives have been incorporated in and on expandable polystyrene particles to improve their molding characteristics, for example, British Patent 976,363 discloses the use of solid water-soluble surface-active agents in powdered form disposed on the surface of the expanded polystyrene materials, pre-expanded and subsequently washing the surface-active agent therefrom. Fatty acid salts such as calcium stearate are indicated as useful.

U.S. Pat. No. 2,857,341 discloses the incorporation of stearic acid in polystyrene and the subsequent steeping of the polystyrene in normal pentane to provide an expandable polystyrene particle. U.S. Pat. No. 3,461,088 discloses the use of small quantities of a fatty acid to coat expandable polystyrene beads which have been pre-expanded to improve or reduce the cooling time. U.S. Pat. No. 3,663,466 uses an alkali metal salt such as calcium stearate infoamable polystyrene polymers to improve fusion, cooling time and provide anticlumping properties. U.S. Pat. No. 3,736,273 discloses the preparation of expandable polystyrene beads which are polymerized in the presence of calcium stearate and subsequently impregnated with blowing agent.

It would be desirable if there were available an improved expandable polystyrene composition which on molding exhibited a short cooling time.

It would also be desirable if there were available an improved foamable particulate polystyrene composition which exhibited a low cooling time and was moldable to a product having fine generally uniform cell size.

These benefits and other advantages in accordance with the present invention are obtained in a mass of expandable polystyrene particles of a size suitable for molding, the particles containing 3 to 10 parts per hundred parts of polystyrene, a volatile fluid-foaming agent selected from the group consisting of n-pentane, isopentane and mixtures thereof and generally uniformly dispersed within the particles from about 100 to 300 parts per million of stearic acid and preferably 140 to 200 parts per million based on total weight of the resinous composition and calcium stearate in a proportion of from about 40 to 120 parts per million and preferably 60 to 100 parts per million based on the total weight of the composition.

Expandable particles in accordance with the present invention are readily prepared by methods well known to the art and as set forth in the hereinbefore cited U.S. patents, the teachings of which are hereby incorporated by reference. Generally such particles are generally spherical beads which vary in diameter from 0.1 millimeter to 5 millimeters. It is essential and critical to the composition of the present invention that the stearic acid and calcium stearate be uniformly dispersed within the composition, that is, be present in each individual particle and not merely deposited on the surface thereof. Such a composition can be prepared in a malaxating apparatus, such as an extruder, by admixing the calcium stearate and stearic acid with heat-plastified polystyrene either in the presence of a fluid-foaming agent or subsequently adding fluid-foaming agent thereto. The desired fluid-foaming agent may be added in such an apparatus or beneficially, if particularly close process control is desired, the alkenyl aromatic resinous material containing the organic acid is beneficially extruded and formed into unfoamed strands and cut into pellets. The pellets are transferred to a pressurized reactor and the pellets suspended in water in the presence of a fluid-foaming or blowing agent and heated for a period of time sufficient for the blowing agent to permeate the pellets. Advantageously, such heating is accomplished at temperatures from about 90° to 150° C under superatmospheric pressure and generally spherical particles are obtained. Such procedures are well known in the art and are set forth in U.S. Pat. Nos. 2,950,261 and 3,086,885.

Conventional suspension polymerization techniques may be employed to prepare polystyrene particles in accordance with the present invention. Generally it is desirable to disperse the stearic acid and calcium stearate within the styrene monomer prior to dispersing the styrene monomer within the suspending water phase. Generaly polymerization is accomplished at a temperature of from about 80° to 100° C and subsequently the volatile fluid-foaming agent is added when polymerizing is for practical purposes complete. The temperature of the reaction mixture is raised and the volatile fluid-foaming agent is added to the reaction vessel until the volatile fluid-foaming agent has permeated the polymer particles. The temperature of the reaction mixture is lowered, usually to a temperature below 50° C and the expandable polystyrene particles are recovered by filtration. The particles are water-washed and dried. Foamable particles beneficially are prepared by incorporating a minor proportion, sufficient to cause foaming, n-pentane, isopentane, and mixtures thereof.

Advantageously, the stearic acid and calcium stearate utilized in the practice of the present invention may be of commercial purity such as technical grades. The proportion of calcium stearate to stearic acid is most easily regulated and controlled when particles in accordance with the present invention are prepared by admixing the components in a heat-plastified melt. When using the suspension polymerization technique when preparing particles in accordance with the present invention, each polymerization system, that is, suspending agent, catalyst, water-phase inhibitor if employed must be standardized for conversion of calcium stearate to stearic acid during the polymerization. It is undesirable to carry out such polymerizations at a pH less than about 3 or greater than about 6. Conveniently, such polymerizations are done in a suspending medium having a pH of about 5.2 ± 0.5 pH units. In the preparation of particles in accordance with the present invention by the suspension system, one can add calcium stearate or stearic acid and convert a portion of the calcium stearate to stearic acid by operating in the lower pH region or alternately by operating in the high pH region one may add stearic acid in the presence of calcium ions and form calcium stearate in situ. Alternately, the careful control of the pH and knowing the distribution coefficients for stearic acid and calcium stearate between the water phase and the styrene monomer, an approximation may be obtained for the appropriate amounts of stearic acid and/or calcium stearate to be added to the reactor.

By way of further illustration, a 100 gallon agitated jacketed polymerization reactor was charged with 352 pounds deionized water, 210 grams of sodium dichromate (water-phase polymerization inhibitor), 116 grams of carboxymethyl methylcellulose. The mixture was agitated until all components had dissolved. In a second agitated vessel, an oil phase mixture was prepared which consisted of 171 grams of azobisisobutyl nitrile, 348 grams of benzoyl peroxide, 136 grams of tertiarybutyl butylperoxybenzoate, 80 grams of calcium stearate, 440 pounds of styrene. The oil phase mixture was added to the polymerization vessel and the agitator rotated at 36 revolutions per minute. The pH of the aqueous phase was about 5.2. The temperature of the contents of the polymerization reactor was raised to 70° C over a period of about one hour and in the following six hours the temperature was raised at a generally uniform rate to a temperature of 120° C. About 30 minutes after reaching 120° C, 132 pounds of n-pentane was slowly added to the reactor and the temperature maintained at 120° C for a further 3½ hour period to insure permeation of the n-pentane into the polystyrene beads. The reactor contents were then cooled to 90° C and a slurry of 8 pounds, 6 ounces of pentabromomonochlorocyclohexane, 29 grams carboxymethyl methyl cellulose in 16 pounds of water were added and the temperature maintained at 90° for four hours. The reactor contents were then cooled to about 35° C. The resultant expandable polystyrene particles were separated from the aqueous phase, water-washed and dried, and are arbitrarily designated as Sample (a). A portion of the resultant polymer beads were analyzed and found to contain 76 parts per million calcium stearate, 140 parts per million stearic acid. Although 400 parts per million of calcium stearate had been added initially to the reactor, a portion of this had been lost in the aqueous phase.

The foregoing procedure was repeated with the exception that calcium stearate was omitted. The expandable beads are designated as Sample (b).

The procedure of the first illustration was repeated with the exception that calcium stearate was omitted and replaced by 300 parts per million based on the styrene, of stearic acid and the product designated Sample (c). Beads of Samples (a), (b) and (c) were pre-expanded in a Rodman type bead expander and aged at ambient temperature and pressure maintained for a period of about 16 hours. The aged beads were molded in a steam-chest mold measuring in feet, 4 × 2 × 1, employing steam as a heat-transfer agent under a pressure of ten pounds per square inch guage and the cooling time determined. The cooling time for Sample (a) was eight minutes; for Sample (b) was 46.6 minutes; and for Sample (c) 5.5 minutes. Sample (c) showing the shortest cooling time was of poor quality due to large cells appearing in the foam beads. Sample (a) had a fine uniform cell structure.

Employing the hereinbefore described polymerization procedure in a 100 gallon reactor, a number of other samples of beads were prepared which differed in composition only in respect to the content of stearic acid and calcium stearate. Foam blocks were prepared using the product of such polymerizations and the cooling time determined. Portions of the various polymerization runs were analyzed to determine the calcium stearate and stearic acid content. The results are set forth in the following Table.

TABLE I

COMPOSITIONS AND COOLING TIMES OF F.I.P. BEADS

| STEARIC ACID | CALCIUM STEARATE | COOLING TIME (minutes) |
|---|---|---|
| 160 | 60 | 6.83 |
| 170 | 75 | 10.17 |
| 225 | 115 | 3.42 |
| 280 | 108 | 2.0 |
| 300 | 105 | 2.32 |
| 140 | 76 | 7.17 |
| 120 | 67 | 20.0 |
| 140 | 75 | 12.5 |
| 140 | 72 | 16.3 |
| 110 | 65 | 25 |
| 95 | 47 | 62.5 |
| 110 | 42 | 62 |
| 95 | 80 | 38.75 |
| 140 | 117 | 19.5 |
| 120 | 55 | 11.83 |
| 160 | 56 | 11.25 |
| 130 | 44 | 9.5 |

In the columns headed "Stearic Acid" and "Calcium Stearate", the numbers indicate parts per million parts of product present in the expandable beads. The results of the experiments were statistically analyzed by linear regression analysis as set forth in *Statistical Analysis in Chemistry and the Chemical Industry*, C. A. Bennett and N. L. Franklin, John Wiley & Sons, Inc., New York, 1954, pp. 222-245, 273-283.

The dependence of cooling time upon stearic acid, or calcium stearate content was best represented by the equation $$T = a x^b$$

where T is the cooling time in minutes, x the concentration of stearic acid in ppm and a and b are constants. The values of a and b found, together with the correlation coefficients are

| | a | b | Correlation Coefficient |
|---|---|---|---|
| Stearic Acid | 1.115 × 10$^7$ | −2.75 | 0.92 |
| Calcium Stearate | 2.994 × 10$^4$ | −1.83 | 0.59 |

The values of the correlation coefficient demonstrate that there is a good correlation between cooling time and stearic acid content, but not between cooling time and calcium stearate content. The calcium stearate, however, is necessary to obtain good cell size and block appearance, as demonstrated above.

Similar beneficial results are obtained when isopentane alone or mixtures of n-pentane and isopentane are employed in place of n-pentane.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a mass of expandable polystyrene particles of a size suitable for molding, the particles containing 3 to 10 parts per hundred parts of polystyrene, a volatile fluid-foaming agent selected from the group consisting of n-pentane, isopentane and mixtures thereof and generally uniformly dispersed within the particles from about 100 to 300 parts per million of stearic acid based on total weight of the resinous composition and calcium stearate in a proportion of from about 40 to 120 parts per million based on the total weight of the composition.

2. The mass of claim 1 containing from 140 to 200 parts per million stearic acid and 60 to 100 parts per million calcium stearate.

3. The mass of claim 1 wherein the particles are generally spherical beads having diameters within the range of 0.1 to 5 millimeters.

* * * * *